(12) United States Patent
Paganessi et al.

(10) Patent No.: US 10,093,875 B2
(45) Date of Patent: Oct. 9, 2018

(54) BIOMASS GASIFICATION/PYROLYSIS SYSTEM AND PROCESS

(71) Applicants: Joseph E. Paganessi, Burr Ridge, IL (US); Peter J. Schubert, Indianapolis, IN (US); Alan D. Wilks, Mount Prospect, IL (US)

(72) Inventors: Joseph E. Paganessi, Burr Ridge, IL (US); Peter J. Schubert, Indianapolis, IN (US); Alan D. Wilks, Mount Prospect, IL (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 303 days.

(21) Appl. No.: 15/198,341

(22) Filed: Jun. 30, 2016

(65) Prior Publication Data
US 2016/0319207 A1 Nov. 3, 2016

Related U.S. Application Data

(60) Division of application No. 13/966,717, filed on Aug. 14, 2013, now Pat. No. 9,416,326, which is a division
(Continued)

(51) Int. Cl.
*C10J 3/34* (2006.01)
*C10J 3/72* (2006.01)
(Continued)

(52) U.S. Cl.
CPC ............... *C10J 3/34* (2013.01); *C10B 53/02* (2013.01); *C10B 57/16* (2013.01); *C10J 3/08* (2013.01);
(Continued)

(58) Field of Classification Search
CPC .......... C10J 2200/158; C10J 2300/0916; C10J 3/30; C10J 2200/15; C10J 3/007; C10J 2200/09; C10J 2200/36; Y02P 20/145; C01B 47/44; Y02E 50/14
See application file for complete search history.

(56) References Cited

U.S. PATENT DOCUMENTS 4,255,161 A * 3/1981 Grimminger ............... B01J 3/02
264/101
4,261,795 A * 4/1981 Reilly ....................... C10B 7/10
110/257
(Continued)

*Primary Examiner* — Imran Akram
(74) *Attorney, Agent, or Firm* — Hartman Global IP Law; Gary M. Hartman; Domenica N. S. Hartman

(57) ABSTRACT

A system for producing a syngas from a biomass material. The system compacts a loose biomass material to form a compacted biomass material at an entrance of a reactor tube, and then heats the compacted biomass material within the tube to form ash and a fuel gas mixture. The fuel gas mixture is withdrawn from the tube and the ash is removed from the tube through an exit thereof. Ingress of air into the tube is inhibited by forming a plug of the biomass material at the entrance of the tube and a plug of ash at the exit of the tube. A neutral atmospheric pressure is maintained in the reactor tube relative to pressure outside the reactor tube by monitoring and adjusting a volumetric rate of the fuel gas mixture withdrawn from the reactor tube based on pressures at the entrance and the exit of the reactor tube.

9 Claims, 1 Drawing Sheet

Related U.S. Application Data of application No. 12/831,601, filed on Jul. 7, 2010, which is a continuation-in-part of application No. 12/760,241, filed on Apr. 14, 2010, now Pat. No. 8,465,562.

(60) Provisional application No. 61/270,393, filed on Jul. 8, 2009, provisional application No. 61/212,624, filed on Apr. 14, 2009.

(51) Int. Cl.
  *C10J 3/20* (2006.01)
  *C10B 53/02* (2006.01)
  *C10B 57/16* (2006.01)
  *C10J 3/08* (2006.01)
  *C10K 1/02* (2006.01)

(52) U.S. Cl.
  CPC ............... *C10J 3/20* (2013.01); *C10J 3/723* (2013.01); *C10J 2200/15* (2013.01); *C10J 2200/158* (2013.01); *C10J 2300/0916* (2013.01); *C10J 2300/0976* (2013.01); *C10J 2300/1269* (2013.01); *C10J 2300/1276* (2013.01); *C10J 2300/1646* (2013.01); *C10J 2300/1693* (2013.01); *C10J 2300/1853* (2013.01); *C10J 2300/1884* (2013.01); *C10J 2300/1892* (2013.01); *C10K 1/024* (2013.01); *Y02E 50/14* (2013.01); *Y02E 50/32* (2013.01); *Y02P 20/145* (2015.11)

(56) References Cited

U.S. PATENT DOCUMENTS

| | | | | |
|---|---|---|---|---|
| 4,738,687 A * | 4/1988 | Smieskol | ............ | B01J 3/02 110/171 |
| 4,968,325 A * | 11/1990 | Black | ............ | C10J 3/482 422/143 |
| 4,978,369 A * | 12/1990 | Pontow | ............ | B01J 3/02 201/35 |
| 5,225,044 A * | 7/1993 | Breu | ............ | C10B 1/10 201/26 |
| 6,149,773 A * | 11/2000 | Grinnshaw | ............ | C10B 1/10 201/21 |
| 6,211,254 B1 * | 4/2001 | Whitney | ............ | C07C 29/1518 252/373 |
| 6,648,932 B1 * | 11/2003 | Maton | ............ | C10B 47/22 48/119 |
| 2004/0052724 A1 * | 3/2004 | Sorace | ............ | C01B 3/22 423/648.1 |
| 2009/0019771 A1 * | 1/2009 | Pearson | ............ | C10L 5/44 48/86 R |
| 2009/0022570 A1 * | 1/2009 | Craig | ............ | C10J 3/30 414/197 |
| 2009/0173005 A1 * | 7/2009 | Neumann | ............ | C10J 3/503 48/86 R |
| 2010/0089295 A1 * | 4/2010 | Moench | ............ | F23B 30/06 110/346 |
| 2011/0271649 A1 * | 11/2011 | Tetzlaff | ............ | B65G 53/48 53/474 |

* cited by examiner

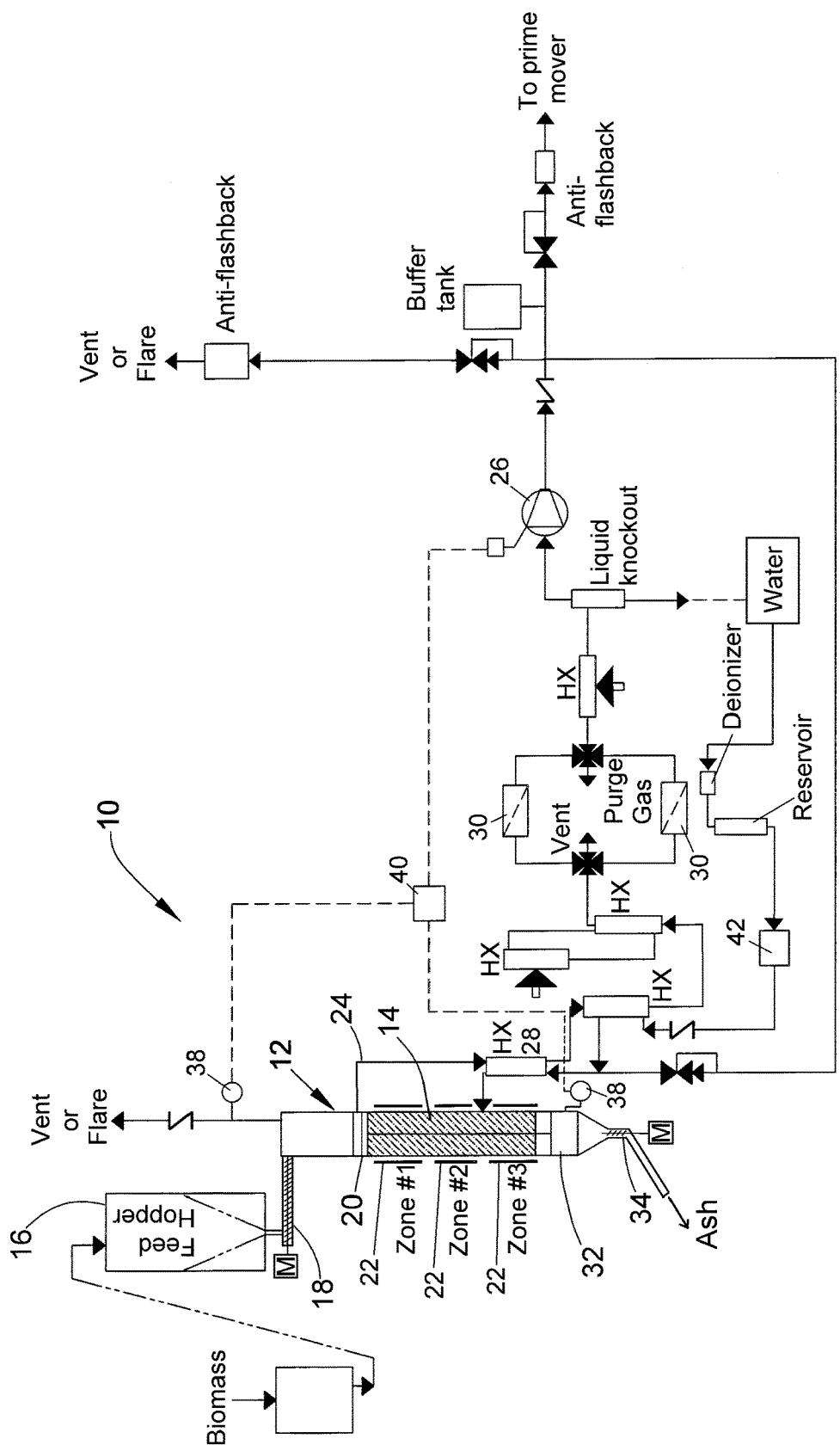

BIOMASS GASIFICATION/PYROLYSIS SYSTEM AND PROCESS

CROSS REFERENCE TO RELATED APPLICATIONS

This is a division patent application of co-pending U.S. patent application Ser. No. 13/966,717, filed Aug. 14, 2013, which is a division patent application of U.S. patent application Ser. No. 12/831,601, filed Jul. 7, 2010. The contents of these prior applications are incorporated herein by reference.

BACKGROUND OF THE INVENTION

The present invention generally relates to the conversion of organic lignocellulosic materials (biomass) into useful fuels (biofuels), and more particularly to a system and process capable of continuous conversion of biomass into synthesis gas (syngas).

Syngas is a gas mixture containing carbon monoxide (CO) and hydrogen gas ($H_2$) produced by the conversion of carbonaceous materials, such as coal, petroleum, and biomass materials. Though having a lower energy density than natural gas, syngas is suitable for use as a fuel source for a variety of applications, including but not limited to gas turbines and automotive internal combustion engines. Syngas can also be used to produce methanol and hydrogen, or converted via the Fischer-Tropsch process to produce a synthetic petroleum substitute.

The use of syngas as a fuel is more efficient than direct combustion of the original biomass because more of the energy contained in the biomass is extracted by the conversion process, known as gasification. Within a typical biomass gasifier, a carbonaceous material is combusted in an atmosphere where the oxygen content is below the stoichiometric limit at which complete combustion can occur. This oxygen-starved combustion of carbonaceous material releases volatiles, in the case of dry feedstock, produces a carbon-rich char, and releases heat. This heat raises the temperature of non-combusted carbonaceous material, causing it to pyrolyze, releasing flammable volatiles such as carbon monoxide (CO), hydrogen ($H_2$) and, depending on the temperatures used, may also produce methane ($CH_4$) and hydrocarbon molecules having a greater number of carbon atoms. This blend of flammable volatiles is termed synthesis gas, or syngas, for short.

In the case of dry feedstock material, it is possible to convert the char into flammable volatiles. One such method is the injection of steam ($H_2O$), which reacts with the char to produce more CO and $H_2$, according to the reaction $$C+H_2O \rightarrow H_2+CO$$

Consequently, the biomass gasification process employs sub-stoichiometric quantities of oxygen or air to combust a portion of the biomass and through pyrolysis, and the optional injection of steam, produce syngas and heat (energy).

Pyrolysis is an endothermic process, and various heating techniques have been proposed for use in the production of syngas, including but not limited to partial combustion of the biomass products through air injection, direct heat transfer by mixing with a hot gas, indirect heat transfer with exchange surfaces (for example, walls or tubes), and direct heat transfer with circulating solids. Each of these heating techniques has significant technical shortcomings. For example, partial combustion results in poor-quality products, for example, a syngas having an energy content of 150 BTU/ft³ or less, because of the dilution of the fuel gasses by the nitrogen in the injected air and the gaseous products of the combustion. With direct heat transfer, typically with a product gas that is reheated and recycled, a shortcoming is that a very large ratio of recycle gas to feed gas is required to provide sufficient heat with reasonable gas flowrates. For indirect heat transfer, it can be difficult to maintain desired heat transfer rates because the process deposits coatings on the heat transfer surfaces that act as insulating materials. Finally, direct heat transfer with circulating solids is effective but requires complex technology because the circulating solids, which typically transfer heat between a burner and a pyrolysis reactor, involve a moving bed that requires a significant investment in equipment and energy management to be effective in a continuous process.

Various types of gasifier designs are known, including counter-current fixed bed (up-draft) gasifiers, con-current fixed bed (down-draft) gasifiers, fluidized bed gasifiers, and entrained flow gasifiers. The most common type of gasifier used in biomass gasification is believed to be the up-draft design, in which a gasification agent (air, oxygen and/or steam) flows upward through a permeable bed of biomass and counter-currently to the flow of ash and other byproducts of the reaction. These gasifier designs have significant technical shortcomings, particularly if the intent is to produce a syngas having a higher energy content, for example, about 300 BTU/ft³ or more, from cellulosic agricultural residue. Most current available technologies, including up-draft and down-draft fixed beds, fluidized beds, or entrained flow gasifiers, can be either pressurized or non-pressurized (atmospheric) design. As previously noted, the use of air for partial combustion to provide the energy for pyrolysis and gasification introduces a large volume of inert diluting gas (nitrogen), which is the major contributing factor to the production of low BTU syngas. Because biomass is a low-energy content fuel and is dispersed geographically, low-BTU syngas negatively affects the economic payback for the gasifier system. The use of an external heat source and/or pure oxygen would overcome the diluent effect of air to allow for the production of a medium BTU syngas (about 300 BTU/ft³ or more). However, a major problem remains as to how to prevent the ingress of air while allowing the egress of syngas from the feed material ingress and the egress of ash from the spent material outlet.

BRIEF DESCRIPTION OF INVENTION

The present invention provides a system and process capable of efficient production of syngas from biomass materials in a manner capable of yielding energy contents of as much as 300 BTU/ft³ and higher.

According to a first aspect of the invention, a system includes a reactor containing a reactor tube having an internal passage within which a neutral atmospheric pressure exists relative to pressure outside the reactor tube, an entrance to the internal passage, an exit to the internal passage, means for compacting a loose biomass material and to form a compacted biomass material at the entrance of the reactor tube, means for heating the compacted biomass material within the reactor tube to a temperature at which organic molecules within the compacted biomass material break down to form ash and a fuel gas mixture, means for withdrawing the fuel gas mixture from the reactor tube, means for removing the ash from the reactor tube through the exit thereof, and means comprising the compacting means, the entrance and the exit of the reactor tube, and the removing means for inhibiting ingress of air into the reactor tube and maintaining the neutral atmospheric pressure within the reactor tube relative to pressure outside the reactor tube by sufficiently compacting the biomass material at the entrance of the reactor tube to form a plug of the compacted biomass material at the entrance, compacting the ash at the exit of the reactor tube to form a plug of the ash at the exit, and monitoring and adjusting a volumetric rate of the fuel gas mixture withdrawn from the reactor tube.

According to a second aspect of the invention, a system includes means for compacting a loose biomass material and simultaneously introducing the compacted biomass material into an entrance of a reactor tube, means for heating the compacted biomass material within the reactor tube to a temperature at which organic molecules within the compacted biomass material break down to form ash and a fuel gas mixture comprising carbon monoxide and hydrogen gases, means for withdrawing the carbon monoxide and hydrogen gases from the reactor tube, means for removing the ash from the reactor tube through an exit thereof, means for inhibiting ingress of air into the reactor tube by sufficiently compacting the biomass material at the entrance of the reactor tube to form a plug of the compacted biomass material at the entrance and compacting the ash at the exit of the reactor tube to form a plug of the ash at the exit, means for monitoring pressures at the entrance and the exit of the reactor tube, and means for maintaining a neutral atmospheric pressure in the reactor tube relative to pressure outside the reactor tube by monitoring and adjusting a volumetric rate of the fuel gas mixture withdrawn from the reactor tube based on the pressures at the entrance and the exit of the reactor tube.

By preventing the ingress of air with the biomass and ash plugs at the entrance and exit, respectively, of the reactor tube, the system and process are capable of producing a syngas having an energy content higher than otherwise possible. Other aspects and advantages of this invention will be better appreciated from the following detailed description.

BRIEF DESCRIPTION OF THE DRAWINGS

FIG. 1 is a schematic of a biomass gasifier system incorporating a neutral atmospheric pressure capability in accordance with a preferred aspect of this invention.

DETAILED DESCRIPTION OF INVENTION

FIG. 1 schematically represents a biomass gasifier system 10 in accordance with an embodiment of the invention. The system 10 is configured to have a neutral atmospheric pressure reactor 12, whose configuration is capable of minimizing energy input and equipment complexity of the system 10. FIG. 1 represents a biomass material as being delivered to the reactor 12 from a bulk hopper 16 via a feeder device 18, represented in FIG. 1 as an auger powered by a motor (M), though other methods of delivery are also within the scope of the invention, such as through the use of a ram or by gravity feed only. The biomass material enters a reactor tube 14 within the reactor 12 through an entrance or throat 20 at an upper end of the tube 14. The tube 14 serves as the containment vessel and defines an internal passage within which the gasification process occurs, producing syngas as a desired product and dry ash as a byproduct. The reactor 12 is configured such that syngas flows out, as does the ash. These characteristics distinguish the present invention from typical gasifiers. The reactor 12 is represented as comprising a single reactor tube 14, though the reactor 12 could comprise an array of parallel tubes (linear, planar, or convex surface) in accordance with co-pending U.S. patent application Ser. No. 12/760,241. If an array of reactor tubes 14 is employed, the tubes 14 are preferably arranged so that their throats 20 lie on a common two-dimensional (2-D) surface (either Euclidian or Riemann), such as on a rectilinear grid or other geometric arrangement for coupling with the biomass hopper 16. Though the reactor 12 and its tube 14 are represented in FIG. 1 as vertically oriented, the tube 14 can be oriented horizontally or at various angles with respect to each other and with respect to gravity (vertical).

The biomass conveyed from the hopper 16 into the open throat 20 of the reactor tube 14 is preferably size-reduced, as is typically the case for corn stover, wood chips, gin trash, dry distillers grain solids, and mess hall organic waste. The particle size of the biomass material is preferably limited to about one-sixth of the diameter of the reactor tube 14. For reasons discussed in more detail below, it is advantageous that the amount of biomass material in the hopper 16 be maintained at a sufficient level to ensure that there is always biomass available to every tube 14 within the reactor 12, such that backflow of syngas is minimized. The biomass within the hopper 16 may be stirred to maintain the material at a uniform height within the hopper 16, especially if the plane in which the tube throat 20 lies is substantially normal to the earth's surface. In FIG. 1, the vertical orientation of the reactor tube 14 results in the biomass material being conveyed downward by gravity and/or other conveying means to the tube 14.

The exterior of the reactor 12 is represented in FIG. 1 as provided with heating elements 22 for heating the biomass within the tube 14. The heating elements 22 can be of a variety of types, including but not limited to resistance heaters, radiant heaters including heat lamps, plasma heaters and electromagnetic heaters. The heating elements 22 are preferably arranged so that the tube 14, and particularly multiple axially-spaced regions (Zones #1, #2 and #3) of the tube 14, capture substantially all of the heat energy generated by the elements 22 and, if multiple tubes 14 are present, the temperature within a given zone within a tube 14 is as similar as possible to the same zone within other tubes. The diameter of the reactor tube 14 is preferably selected such that the heating elements 22 are as nearly as possible able to uniformly heat the biomass material across the cross-section of the tube 14 and within the time period required for the biomass material to travel through the tube 14 and become pyrolyzed. Thus, the length and diameter of the reactor tube 14 are interdependent based on this common concept.

FIG. 1 further shows the reactor 12 fitted with a gas line 24 that withdraws syngas from the tube 14 as it is produced. The entrance to the gas line 24 is preferably oriented and located outside the heated zones to reduce the likelihood that biomass material will enter the gas line 24. In the embodiment represented in FIG. 1, syngas produced by the pyrolysis and gasification process is drawn through the gas line 24 with a blower 26 (or other suitable device, such as a compressor). The blower 26 draws the syngas through a series of heat exchangers (HX) and particulate filters 30 before being delivered to a prime mover (as indicated in FIG. 1), a holding tank, downstream process, fuel cell, or any other suitable destination. A gasification agent may be employed to assist in the conversion of char to syngas via the known water-gas shift reaction. As represented in FIG. 1, the gasification agent may be steam and the source of the steam may be water that is drawn from a water source by a pump 42 and then heated by a heat exchanger 28 through which the syngas passes, such that the syngas serves as the heat source for generating the steam introduced into the tube 14 through the line 36.

According to a preferred aspect of the invention, the reactor 12 and its tube 14 are configured to promote compaction of the biomass within the throat 20 of the tube 14, such that backflow of syngas through the tube 14 is inhibited. For this purpose, the biomass is preferably continuously supplied to the tube 14 to form a moving "plug" of biomass material within the tube throat 20. The throat 20 may be configured to have a flared shape (not shown) that promotes compaction of the biomass as it enters the tube 14. The tube 14 may be optionally sealed to prevent backflow of syngases toward the tube throat 20, as well as to allow for maintenance. The continuous supply of biomass to the tube 14 also serves to push the dry ash byproduct of the reaction through the tube 14 and into a manifold 32, which can employ gravity and/or another ash removal system 34 (such as the auger represented in FIG. 1) to remove the ash from the system 10. In this manner, in addition to forming the aforementioned plug of biomass material to seal the throat 20 of the tube 14, the biomass is continuously supplied to the reactor tube 14 to promote the formation of an ash plug within the ash removal system 34 located downstream of the manifold 32, effectively forming a seal within the manifold 32. The formation of an ash plug within the manifold 32 can be promoted by tapering the manifold 32 as shown in FIG. 1, which forces or compacts the ash similarly to an extrusion process. An alternative is to have a section of pipe where the transport mechanism (for example, the auger or other device) through the manifold 32 is absent or interrupted and the ash is forced through this portion, thus compacting the ash slightly.

In addition to forming a barrier to the ingress of air into the tube 14, plugging the ends of the tube 14 with biomass and ash also serves to better contain the heat within the reactor tube 14 to promote the gasification reaction and reduce the risk of a fire in the hopper 16. The degree to which the tube throat 20 is tapered, the degree to which the feeder device 16 is capable of packing the biomass material into the throat 20, and the distance of the feeder device 16 from the opening of the throat 20 will all affect the axial length and density of the biomass plug within the tube 14. It can be appreciated that there may be more than one combination of these three factors which provide the desired or optimal performance in a given configuration. To address the contingency that the tube 14 becomes starved of biomass material, the tube 14 may be equipped with means (not shown) for closing its throat 22. Such closing means may include, but is not limited to, driving the corresponding feeder device 16 further into the throat 20 of the starved tube 14 and providing with a flat plate to promote a better seal, provide a knife valve at or near the throat 20 to seal a starved tube 14, and/or closing a valve (not shown) through which syngas is drawn from the starved tube 14. Each of these closing means, individually or in combination, may be employed to minimize the risk of fire, minimize back-diffusion of the desired syngas product, and minimize heat loss to promote process efficiency and reduced hazard risks.

Further features of the system 10 and of the tube 14 of the system 10 are discussed below, some of which are similar to or derived from certain process and design parameters reported in U.S. patent application Ser. No. 12/357,788.

The temperature of pyrolysis employed by this invention can vary, but preferably ranges from about 800 to about 1100° C. Within the reactor tube 14, there is preferably a temperature profile which most effectively converts the solid biomass into syngas. This profile may prompt the use of the three-zone heater arrangement shown in FIG. 1 where, for example, biomass encounters the first heating zone (Zone #1) after it enters the tube 14 where the biomass is heated to nearly its volatilization temperature (typically around 350° C.), then enters a second heating zone (Zone #2) where its temperature is increased to the full pyrolysis temperature, such that molecules are rapidly cracked before they can form heavy or toxic compounds. If a third heating zone (Zone #3) is used as shown in FIG. 1, the temperature within the third zone is maintained so that mineral ash remaining after pyrolysis will not form low-melting point glasses that may not flow readily through the reactor tube 14.

Waste heat generated from the heating elements 22 and lost from the tube 14 may be harvested and used for a variety of purposes. The gas effluent may also be run through a heat exchanger, heat pipe, or other means of heat transfer to provide heat which can be used to advantage in the overall method. The waste heat can be conveyed in many ways, including but not limited to a working fluid, a heat pipe (single-phase or two-phase), a conductive media such as metal or diamond, by radiation, or by convection of a suitable working fluid. The harvested waste heat may be used, as nonlimiting examples, to dry incoming biomass, heat the reactor tube 14 (such as at Zone #1), and heat devices used to remove liquid and/or solid residues from the system. Waste heat may also be harvested in more useful forms, such as for the purpose of running a Stirling engine for mechanical work, operating a thermoelectric cooler (Peltier effect) for electrical power, or used outside the system 10 for essentially any desired purpose. Waste heat, including exhaust gasses from a prime mover or SOFC, can be particularly useful for drying a biomass material that has a high moisture content. Injection of hot, dry air into the hopper 16 could be used for this purpose to obtain several benefits, including driving-off excess moisture in the biomass material and separating or fluffing the biomass material to avoid bridging or rat-holing.

If the primary axis of the reactor tube 14 is horizontal, it may be advantageous for the axis to tilt downward toward the end of the tube 14 opposite its throat 20. The purpose of this slope is to encourage any gasses, rolling debris, or packed ash to be conveyed to the ash manifold 32 coupled to the end of the tube 14. If the primary axis of the reactor tube 14 is essentially vertical, it may be advantageous to provide the tube 14 with one or more spikes (not shown) that project into the interior of the tube 14 so that biomass material falling into the tube 14 impinges the spikes to break up any large biomass chunks as well as restrict the flow of biomass material through the tube 14 and thereby increase the residence time of the biomass material within the hottest zones of the tube 14. In addition, a grate (not shown) can be located at or near the base of each spike to assure that little or no biomass material falls entirely through the reactor tube 14 without becoming gasified.

As previously noted, to minimize energy input and equipment complexity, the system 10 of this invention is configured to have a neutral atmospheric pressure achieved by plugging the entrance (throat 20) and exit (manifold 32) of the tube 14 with biomass and ash, respectively. Such a capability can be promoted by utilizing highly sensitive differential pressure sensors 38 at the tube entrance and/or the ash removal section of the system 10 and a closed-loop control system 40 to monitor and adjust the volumetric rate of gaseous discharge via the blower 26 used to draw the syngas through the gas line 24. The integrity of the biomass and ash seals at a given pressure is a function of leakage rate due to the porosity/composition of the biomass or ash plug. The porosity of the plugs can be adjusted by the degree of compaction of the biomass material being transported. This capability is particularly desirable from the stand point of eliminating the need for a lock hopper system to prevent the ingress of air into the reactor tube 14 or unwanted leakage of syngas from the ash removal section 34 by ensuring that the system 10 operates with inlet and outlet pressures within certain limits.

The closed-loop control system 40, with suitable parameters (such as a PID controller or other methods known to those skilled in the art), can also be used to introduce a controlled amount of water or water vapor (including steam) based on properties of the syngas. These properties may include, but are not limited to, the moisture content of the syngas, the moisture content of the incoming carbonaceous feedstock material, the amount of liquid condensed out in a condenser, the conductivity of the gas, or other means known to those skilled in the art. There are also means by which the output gas properties, such as pressure or temperature, can be used in a chemical and/or mechanical system to regulate the amount of water introduced. Introduction of the water may be accomplished in many ways, including but not limited to injection, osmosis, control valve, diffusion, or wicking/capillary action.

As should be understood, particularly in view of the foregoing discussion, the ingress of air into the reactor tube 14 would have an unwanted diluent effect on the syngas produced, thus reducing its heating value and leading to an overall net energy efficiency decrease, while leakage of syngas from the reactor 12 would introduce potentially significant safety issues and have a net overall decrease in energy efficiency, especially if the leakage is such as to reduce the energy production capabilities of the system 10. Without the use of biomass and ash plugs within the tube throat 20 and manifold 32, respectively, direct diffusion of air into the system 10 and syngas out of the system 10 at balanced is only $4.277 \times 10^{-6}$ and $9.427 \times 10^{-4}$ mass fraction of syngas production rate, respectively. By utilizing plugs at these locations, the direct diffusion rate is even smaller, resulting in an efficient syngas production process capable of yielding energy contents of as much as 300 BTU/ft$^3$ and higher.

While the invention has been described in terms of a specific embodiment, it is apparent that other forms could be adopted by one skilled in the art. For example, the physical configuration of the system 10 and its components could differ from that shown, and materials and processes other than those noted could be used. Therefore, the scope of the invention is to be limited only by the following claims.

The invention claimed is:

1. A system for producing syngas from biomass materials, the system comprising:
a reactor containing a reactor tube having an internal passage within which a neutral atmospheric pressure exists relative to pressure outside the reactor tube, an entrance to the internal passage, and an exit to the internal passage, the reactor tube and the internal passage thereof being adapted to contain a compacted biomass material moving through the internal passage and to contain a pyrolysis reaction of the compacted biomass material by which a fuel gas mixture comprising carbon monoxide and hydrogen gases is formed therefrom within the reactor tube;
means for compacting a loose biomass material and forming therefrom the compacted biomass material at the entrance of the reactor tube;
means for heating the compacted biomass material within the reactor tube to a temperature at which the pyrolysis reaction occurs whereby organic molecules within the compacted biomass material break down to form ash and the fuel gas mixture;
means for withdrawing the fuel gas mixture from the reactor tube;
means for removing the ash from the reactor tube through the exit thereof;
means comprising the compacting means, the entrance and the exit of the reactor tube, and the removing means for inhibiting ingress of air into the reactor tube and maintaining the neutral atmospheric pressure within the reactor tube relative to pressure outside the reactor tube by sufficiently compacting the biomass material at the entrance of the reactor tube to form a plug of the compacted biomass material at the entrance, compacting the ash at the exit of the reactor tube to form a plug of the ash at the exit, and monitoring and adjusting a volumetric rate of the fuel gas mixture withdrawn from the reactor tube.

2. A system of producing syngas from biomass materials, the system comprising:
means for compacting a loose biomass material and simultaneously introducing the compacted biomass material into an entrance of a reactor tube;
means for heating the compacted biomass material within the reactor tube to a temperature at which organic molecules within the compacted biomass material break down to form ash and a fuel gas mixture comprising carbon monoxide and hydrogen gases;
means for withdrawing the carbon monoxide and hydrogen gases from the reactor tube;
means for removing the ash from the reactor tube through an exit thereof;
means for inhibiting ingress of air into the reactor tube by sufficiently compacting the biomass material at the entrance of the reactor tube to form a plug of the compacted biomass material at the entrance and compacting the ash at the exit of the reactor tube to form a plug of the ash at the exit;
means for monitoring pressures at the entrance and the exit of the reactor tube; and
means for maintaining a neutral atmospheric pressure in the reactor tube relative to pressure outside the reactor tube by monitoring and adjusting a volumetric rate of the fuel gas mixture withdrawn from the reactor tube based on the pressures at the entrance and the exit of the reactor tube.

3. The system according to claim 2, wherein the reactor tube comprises first and second heating zones through which the biomass material travels in sequence, and the second heating zone is at a higher temperature than the first heating zone.

4. The system according to claim 2, further comprising means for injecting a gasification agent into the reactor tube.

5. The system according to claim 4, wherein the gasification agent is steam.

6. The system according to claim 4, wherein the reactor tube comprises first and second heating zones through which the biomass material travels in sequence, the second heating zone is at a higher temperature than the first heating zone, and the gasification agent is introduced into the second heating zone within the reactor tube.

7. The system according to claim 2, further comprising a hopper from which the biomass material is transported to the entrance of the reactor tube.

8. The system according to claim 2, wherein the entrance of the reactor tube is flared to promote compaction of the biomass material within the entrance.

9. The system according to claim 2, further comprising a manifold that the ash enters from the exit of the reactor tube, wherein the manifold is tapered to promote compaction of the ash within the exit of the reactor tube.

* * * * *